United States Patent [19]

Georgopoulos et al.

[11] Patent Number: 5,222,776
[45] Date of Patent: Jun. 29, 1993

[54] SECURITY SEAL AND LOCK

[75] Inventors: George Georgopoulos, Pine Brook; Richard C. Dreisbach, North Arlington, both of N.J.

[73] Assignee: E. J. Brooks Company, Newark, N.J.

[21] Appl. No.: 973,788

[22] Filed: Nov. 9, 1992

[51] Int. Cl.⁵ ............................................. B65D 33/34
[52] U.S. Cl. ............................... 292/323; 292/307 R; 292/252
[58] Field of Search ............ 24/115 G, 115 L, 136 A, 24/136 L; 292/252, 307 R, 315, 319, 321, 325, 326, 327, 323, 307 B, 318

[56] References Cited

U.S. PATENT DOCUMENTS

| | | | |
|---|---|---|---|
| 918,570 | 4/1909 | Mather | 292/318 |
| 3,994,521 | 11/1976 | Van Gompel | 292/252 X |
| 4,049,303 | 9/1977 | Irwin et al. | 292/307 R |
| 4,280,726 | 7/1981 | McCoag | 292/318 X |
| 4,640,538 | 2/1987 | Brammall | 292/323 |
| 4,747,631 | 5/1988 | Loynes et al. | 292/307 R |

*Primary Examiner*—Richard E. Moore
*Attorney, Agent, or Firm*—John G. Gilfillan, III

[57] ABSTRACT

A seal and lock includes a flexible metal cable held permanently at one end in a housing, the other end being insertable through the housing and is locked therein by a spring-biased ball which wedges against the cable upon an attempt to pull the cable from the housing. A second ball is located between the spring and the first-mentioned ball, and wedges against the cable to further prevent removal thereof and to prevent twisting of the cable as a way of removing the cable from the housing. The second ball is of sufficiently soft material so that the cable when pulled digs into the second ball to increase the jamming force against the cable.

12 Claims, 2 Drawing Sheets

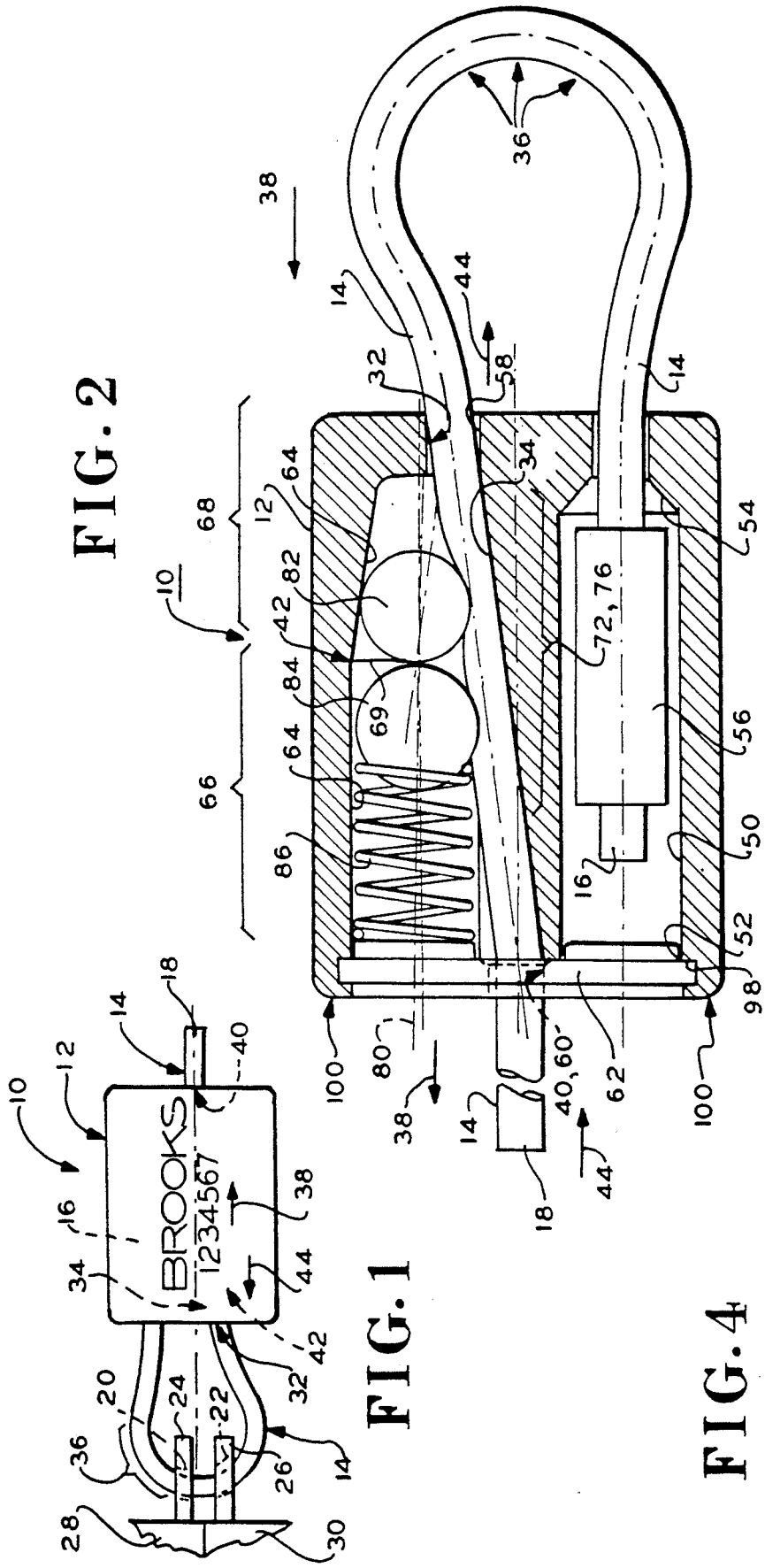

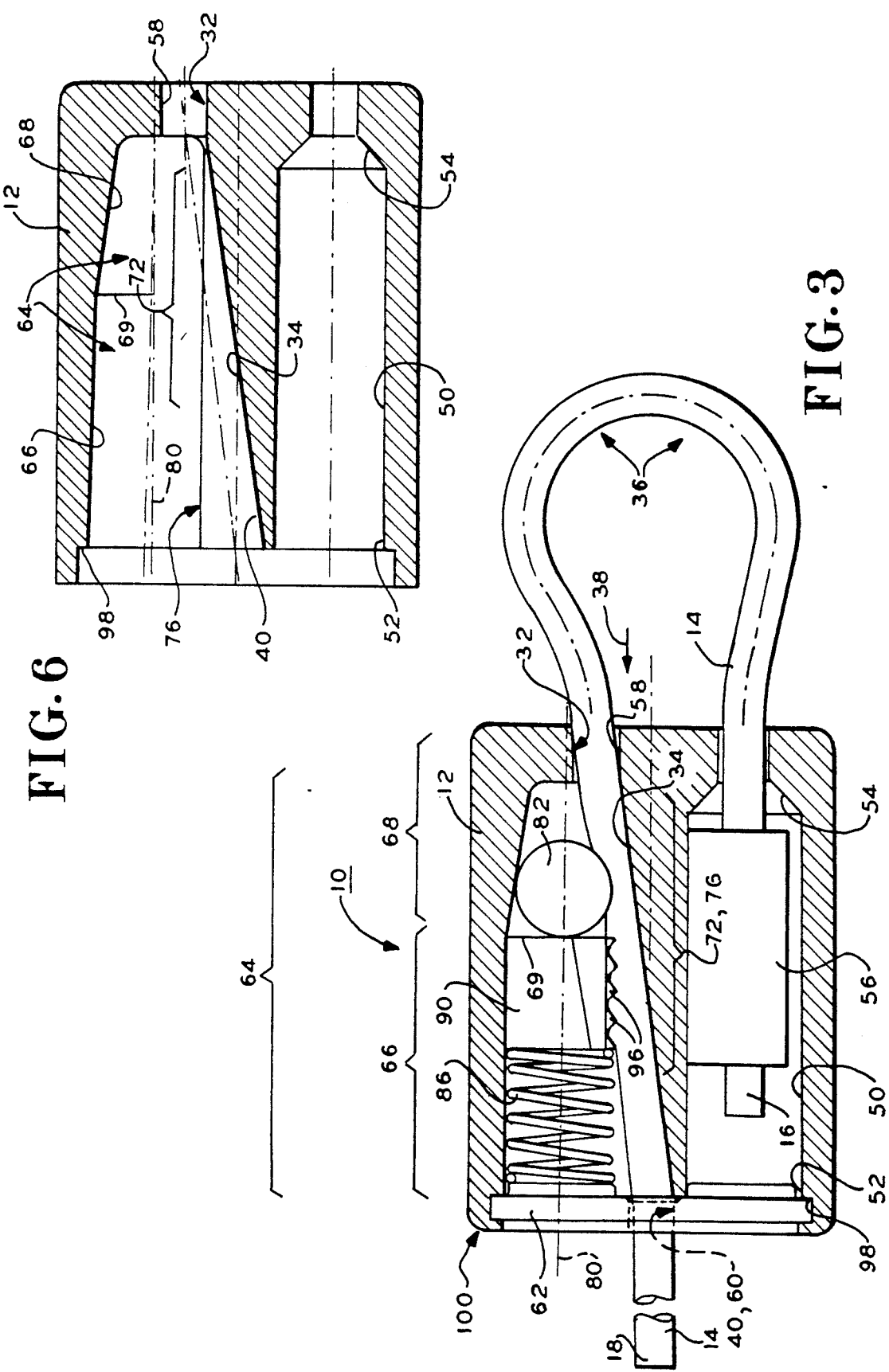

SECURITY SEAL AND LOCK

BACKGROUND OF THE INVENTION

The present invention relates to an improved security seal and lock and, more particularly, to an improved security seal and lock of the type which includes a robust housing. usually, but not necessarily, made of metal. and a flexible metal cable, one end of which is permanently held in the housing and the other end of which is selectively insertable into and through the housing in a first direction but is not removable in a reverse direction from the housing once so inserted.

Housing-and-cable devices for sealing and locking lockable element such as hasp on a door are known. See for example British Patent 1880 (Issue Jan. 23, 1913) and the following U.S. Pat. Nos. 3,994,521 to Van Gompel; 4,049,303 to Irwin, et al.; 3,770,307 to Van Gompel; 4,747,631 to Loynes, et al.; 5,092,641 to Penick; and 4,216,568 to Anderson, which patent is not, strictly speaking, a patent relating to a security seal and lock but which describes a metal-wire-tensioning apparatus which is constructed and which operates similarly to the seals/locks of the foregoing patents.

Typically, housing-and-cable seals and locks may be used to immobilize the door hasp of shipping vehicles such as railroad boxcars and semi-trailers. Such use provides a method of rendering difficult unauthorized access to goods and materials contained within the boxcars in the semi-trailers. In the event that unauthorized entry does occur as a result of breaking or disintegrating the seal and lock, a visual indication of such unauthorized entry is provided.

It has been, and continues to be, a goal of suppliers of security seals and locks of the housing-and-cable type to provide a seal and lock which is simple in construction, which can be emplaced on the vehicle or container to be safeguarded without the use of special tools, and which cannot be removed unless substantial effort is expended to destroy the device.

In typical prior art security seals and locks of the housing-and-seal type under discussion. one end of a metal cable is more or less permanently affixed to, or more preferably, mounted within, a metal housing. The housing includes a path or passage therethrough along which the other end of the cable may be inserted into, through and out of the housing. The passage or path intersects a cavity within the housing. The cavity may be, in part, defined by a wall or surface which slopes away from the point of entry of the cable into the housing. The cavity may also be slightly skewed relative to the passage way so that a wall thereof slopes away from the point of entry of the cable into the housing.

A ball or disk is located within the cavity. The ball or disk simultaneously engages both the sloping cavity wall and the cable after its insertion. Typically a biasing member such as a spring urges the ball or disk toward the point of entry of the cable into the housing.

Entry of the cable into and through the housing and along the path causes the cable to engage the ball or disk and to move the ball or disk against the action of the biasing member away from the point of entry of the cable into the housing. In actual use, the insertion of the cable into the housing occurs after the cable has been passed through appropriate holes or openings in a hasp or other lockable element of a door or closure on a boxcar, trailer or other vehicle or container so that the now looped cable immobilizes the hasp or other lockable member.

An attempt to withdraw the cable from the housing by moving it in a reverse direction causes the cable to frictionally engage the ball or disk moving it in the direction of the point entry of the cable. At the same time, the biasing member also acts to move the ball or disk in this same direction. Ultimately, after a small amount of movement of the ball or disk toward the point of entry of the cable, the ball or disk becomes jammed between the cable and the narrowing space defined by the sloped wall of the cavity. Ultimately, this jamming effect becomes so great as to render quite difficult, if not prevent, removal of the cable from the housing without breaking the housing or cutting the cable.

Where a ball is used, it has been found that there is some possibility of withdrawing the cable from the housing if a pulling force and a twisting force are simultaneously applied to the cable. This is apparently due to the fact that twisting causes the ball to roll; such rolling to some extent ameliorates or avoids the jamming of the ball into the cable so that sufficient force to prevent the cable's withdrawal is not applied.

Accordingly, one object of the present invention is the provision of a housing-and-cable lock and seal which is simple in construction, which can be emplaced without the use of special tools which cannot be removed without destruction of the device and which obviates defeat by simultaneous twisting and pulling of the cable.

SUMMARY OF THE INVENTION

With the above and other objects in view, the present invention comprises an improved security seal and lock. The security seal and lock is of the type which includes a flexible metal cable. A first end of the cable is held or permanently mounted in a robust housing. A second opposed end of the cable is selectively insertable through a lockable assembly, such as a hasp or the like, and is then insertable into a first end and out of a second end of a path or passage through the housing. In this way, the lockable assembly is sealed and locked by the resulting cable loop.

Within the housing is a one-way facility which includes a generally cylindrical cavity which extends generally along and is intercepted by the path or passage. The zone of intersection of the path or passage and the cavity constitutes a chamber, the transverse dimension of which decreases in the direction of the first path or passage end and increases in the direction of the second path or passage end. The one-way facility also includes a ball in the chamber which is biased by a biasing facility, for example a spring, toward the first path passage end.

Insertion of the second cable end into the first path or passage end causes the cable to engage the ball and move the ball against the bias of the spring and away from the first path passage end to permit the second cable end to move through the path or passage and out of its second end. An attempt to reversely move the cable causes the bias of the spring and the drag force of the cable on the ball to conjointly move the ball toward the first passage end. This jams the ball against the chamber and the cable in the portion of the chamber having the decreased transverse dimension thereby preventing withdrawal of the cable.

In the type of seal and lock described above, withdrawal of the cable may at times be achieved by simultaneously pulling on the cable and twisting it. The improvement of the present invention prevents this withdrawal. Specifically, in its broadest aspects, the improvement comprises a facility which is located between the spring and the ball. This facility is responsive to twisting of the cable incident to an attempt to withdraw the cable from the passage for increasing the jamming force on the cable.

In one preferred embodiment, the increasing facility may constitute a larger ball in the cavity located between the first ball and the spring. The larger ball may be made of a relatively soft material such as aluminum. Insertion of the cable into the housing is achieved as described above. If an attempt to withdraw the cable involves both a pulling force on the cable and twisting of the cable, the cable pulls the larger ball against the smaller ball to amplify the jamming force of the smaller ball on the cable. This occurs as the larger ball is pulled into the portion of the chamber housing the decreased transverse dimension. If the larger ball is made of a relatively soft material, the twisting cable will dig into the second larger ball, thereby increasing the frictional drag exerted on the larger ball by the cable as pulling is effected. In this manner, the larger ball is (i) is positively pulled with the cable to exert a jamming force between the portion of the chamber which has the decreased transverse dimension and the cable and (ii) is also positively pulled against the smaller ball to amplify and increase its jamming force on the cable.

In a second preferred embodiment, the increasing facility is a generally cylindrical member having serrations formed around a portion of its circumference which is located within the chamber so that its major axis is generally along the chamber. The cylindrical member is located so that its serrations face the cable path or passage. Again, insertion of the cable is achieved as set forth above. If an attempt to withdraw the cable is accompanied by both pulling and twisting, the serrations on the cylindrical member dig into the cable and the cylindrical member becomes jammed against the cable and the portion of the chamber having the decreased transverse dimension. Additionally, the movement of the cylindrical member toward the point of insertion of the cable causes it to abut the ball and to move the ball toward the point of insertion so that the ball jams even harder against the chamber and the cable.

BRIEF DESCRIPTION OF THE DRAWING

FIG. 1 is a front elevation of a security seal and lock according to the present invention with the seal and lock in place to immobilize hasps mounted to otherwise relatively moveable members for sealing and locking thereof;

FIG. 2 is a sectional view of the security seal and lock of FIG. 1 which shows the internal structure thereof according to a first embodiment of the present invention;

FIG. 3 is similar to FIG. 2 and depicts a second embodiment of the present invention;

FIGS. 4 and 5 constitute respectively an end view and front elevation of an element of the security seal and lock depicted in FIG. 3; and FIG. 6 is a sectioned elevation of a housing used in the security seal and lock of FIGS. 1-3.

DETAILED DESCRIPTION

A security seal and lock 10 according to the present invention includes a housing 12 and a cable 14. The housing 12 may be made of any robust material such as cast zinc (ZAMAK #3), which may be chromated to provide resistance to environmental degradation, or nylon, 30% of the volume of which is filled with glass fibers. The housing 12 may be made of any other material which is robust and is more or less resistant to being easily broken or rendered disintegral. The cable is preferably flexible cable such as 16 or 3/32 aircraft cable, 7×7 galvanized steel (MIL-W-83420B).

The cable 14 has a first end 16 (not visible in FIG. 1) which is held, or is more or less permanently mounted within, the housing 12. A second end 18 of the cable 14 is normally free.

In use, the second end of 18 of the cable 14 is first inserted through holes or openings 20, 22 formed through hasps 24, 26 which are mounted to or are formed integrally with two moveable members 28, 30 such as a door and a door jam, two doors, etc. Obviously, one or more of the hasps 24, 26 could be configured as the staple of a staple/hasp door-locking arrangement.

After the second end 18 of the cable 14 is passed through the holes 20 and 22, it is inserted it the first end 32 of a path or passage 34 (not visible in FIG. 1) formed through the housing 12. Such insertion forms the cable 14 into a loop 36 where it passes through the holes 20 and 22. As shown by the directional arrow 38, following initial insertion of the second end 18 of the cable 14 into the first end 32 of the path or passage 34, such second end 18 and the cable 14 itself are moved through the path or passage 34 until the second cable end 18 exists the housing 12 from a second end 40 of the path or passage 34.

As is known in the prior art, the housing 12 preferably includes a one-way facility 42 (not visible in FIG. 1) which permits the cable 14 to be moved through the passage 34 in the direction of the arrow 38, but which prevents the cable 14 from being withdrawn from the path or passage 34 in the direction of the arrow 44.

The presence of the cable loop 36 in the holes 20 and 22 immobilizes the hasps 24 and 26 and the moveable members 28 and 30, thereby sealing and locking the members 28 and 30 to secure the contents of any container or vehicle of which they form a part and which contains goods or merchandise.

Referring now to FIG. 2, there is shown a first preferred embodiment of the present invention. As may be seen, the housing 12 includes a bore 50 which is opened at one end 52 and which narrows at its other end 54 so as to ultimately have a diameter only slightly larger than the diameter of the cable 14. The first end 16 of the cable 14 is located within the bore 50. Attached to this first end 16 is a ferrule 56 which is attached to the cable 14 in any convenient fashion. The ferrule 56 has a diameter substantially larger than the narrow end 54 of the bore 50, thus preventing withdrawal of the first cable end 16 from the bore 50. In this or a functionally equivalent manner, the first end 16 of the cable 14 is held in, and more or less permanently mounted to, the housing 12.

Referring to FIGS. 2 and 6, the path or passage 34 may be seen to extend between the first end 32 and the second end 40 thereof. The first end 32 of the path or passage 34 constitutes a hole 58 formed through the housing 12. As described in greater detail below, the second end 40 of the passage 34 may constitute a hole 60 formed through a closure plate or plug 62 which is mounted to the housing 12 so as to close the bore 50 and a cavity 64 also formed in the housing 12.

The cavity 64 has a generally cylindrical portion 66 extending from the vicinity of the second end 40 of the path or passage 34 toward the first end 32 of the path or passage 34, and a conical portion 68, the diameter or transverse dimension of which decreases from its intersection (at 69) with the cylindrical portion 66 in the direction of the first end 32 of the path or passage 34. The path or passage 34 intersects the cavity 64 along a zone of intersection 72. Along this zone of intersection 72 the path or passage 34 and the cavity 64 may be viewed as together constituting a chamber 76. Preferably, as shown in the Figures, the path or passage 34 is slightly skewed or angularly related to the major or longitudinal axis 80 of the cavity 64. As a consequence, the transverse dimension of the chamber 76 decreases in the direction of the first end 32 of the path or passage 34. This diametric decrease is due to both the diametric decrease of the conical portion 68 and to the angular relationship of the path or passage 34 relative to the cavity 64.

Within the chamber 76 there are located a first ball 82 and a second ball 84. Acting between the closure plate 62 and the second ball 84 is a resilient or biasing member 86 such as a coil spring or a functionally equivalent element.

Ignoring for the time being the second ball 84 and assuming that the resilient member 86 acts directly against the first ball 82, the operation of prior art devices will be described.

Upon insertion of the second end 18 of the cable 14 into the first end 32 of the path or passage 34, and following additional insertion of the cable 14, such cable 14 contacts the periphery of the first ball 82. Movement of the cable 14 frictionally carries or drags the ball 82 leftwardly in FIG. 2 against the force of the resilient member 86 into the larger diametric portion of the chamber 76 defined by the cylindrical portion 66. Continued movement of the cable 14 along and through the path or passage 34 continues until the second end 18 of the cable 14 exits the second end 40 of the path or passage 34. The foregoing movement of the cable 14 is in the direction of the arrow 38. If a pulling force is now applied to the cable 14 in the direction of the arrow 44, both the frictional drag of the cable 14 on the first ball 82 and the force of the resilient member 86 urge and move the first ball 82 farther and farther into the diametrically decreasing portion of the chamber 76 defined by the conical portion 68. At some point the first ball 82 is jammed with great force against the wall of the conical portion 68 and the cable 14. The jamming of the first ball 82 against the cable 14 jams the cable 14 against the wall of the path or passage 34. In theory, this jamming prevents the cable 14 from being withdrawn from the housing 12.

While the foregoing structure operates reasonably well, it has been found that there is, in some circumstances, a possibility that applying both a pulling and a twisting force to the cable 14 can permit defeat of the seal and lock 10. Specifically, where only the first ball 82 is present, appropriate twisting of the cable 14 while a pulling force is judiciously applied to the cable 14, causes the first ball 82 to roll tangentially to the cable 14 and permits the cable 14 to be "eased out" of the path or passage 34 and its first end 32.

Accordingly, the present invention constitutes facilities responsive to twisting of the cable 14 for increasing the jamming force on the cable 14 to prevent its withdrawal from the housing 12.

In FIG. 2, the jamming force-increasing facility constitutes the second ball 84. In all preferred embodiments of the prevent invention the first ball 82 is made of stainless steel and is relatively hard. This leads to durability and the ability of the ball 82 to forcefully jam the cable 14. The hardness of the first ball 82, however, also probably contributes to the ability to withdraw the cable 14 from the housing 12 by twisting the cable 14 as described above. In the present embodiment, the second, larger ball 84 may be made of aluminum.

As shown in FIG. 2, the second ball 84 is located in the chamber 76 along with the first ball 82 and is positioned between the resilient member 86 and the first ball 82. Because of its location in a somewhat enlarged diametric portion of the chamber 76, the second ball 84 has a larger diameter than the first ball 82. The second ball 84 may also be softer than the first ball 82 for a purpose described immediately below.

As shown in FIG. 2, with the cable 14 fully inserted, an attempt to withdraw the cable 14 results in the first ball 82 jamming between the conical portion 68 of the cavity 64 and the cable 14 and the second ball 84 jamming between the cylindrical portion 66 of the cavity 64 and the cable 14. Thus when only a pulling force is applied to the cable 14, the seal and lock 10 of the present invention performs similarly to the seals and locks of the prior art.

Assuming now that both a twisting force and a pulling force are applied to the cable 14, while twisting may tend to cause the harder first ball 82 to rotate within the chamber 76, the pulling force applies to the larger diameter second ball 84 is sufficient to move the second ball 84 against the first ball 82. This has the effects of inhibiting rotation of the first ball 82 and of jamming the first ball 82 even more firmly against the cable 14 and into the portion of the chamber 76 having the decreased transverse or diametric dimension. Both effects amplify the jamming force of the first ball 82 on the cable 14.

Where, as preferred, the second ball 84 is softer than the first ball, as when it is made of aluminum, the cable 14 will dig into the softer second ball 84, ultimately positively preventing the second ball 84 from rotating within the chamber 76. The cable 14 being now dug into the second ball 84, positively pulls the second ball 84 rightwardly as viewed in FIG. 2. Rightward movement of the second ball 84 further jams this ball 84 against the walls of the cylindrical portion 66 of the cavity 64 and the cable 14; it also urges the second ball 84 against the first ball 82. This latter action moves the first ball 82 further into the diametrically decreasing conical portion 68 increasing the jamming force of the first 82 on the cable 14. Thus removal of the cable 14 by twisting and pulling the cable 14 is prevented by the force-increasing function of the second ball 84.

A second preferred embodiment of the present invention 10 is shown in FIG. 3. Like reference numbers are used for elements which are like or similar to those shown in FIG. 2.

In FIG. 3, the second ball 84 is replaced by a generally cylindrical member 90, shown in greater detail in FIGS. 4 and 5. The member 90 may be made of zinc (ZAMAK III) and comprises a semi-circular peripheral portion 92 and a serrated non-circular peripheral portion 94. The member 90 is located in the chamber 76 so that the major axis thereof generally aligns with the axis of the coil spring 86 and the first ball 82. Further, the member 90 is located in the chamber 76 so that the serrations 96 face the path or passage 34. An attempt to remove the cable 14 from the seal and lock 10 of FIG. 3 by applying both twisting and pulling force to the cable 14 causes the serrations 96 of the member 90 to dig into the cable 14 until the member 90 cannot rotate within the chamber 76. The non-circularity of the member 90 may be such as to positively present its rotation within the cylindrical portion 66 of the cavity 64. The foregoing results as the member 90 is moved rightwardly in FIG. 3 and is jammed more and more against the walls of the generally cylindrical portion 66 of the cavity 64 and the cable 14. As with the embodiment of FIG. 2, the member 90 also abuts the first ball 82 increasing the jamming force of the first ball 82 against the walls of the conical portion 68 of the cavity 64 and the cable 14. Again, twisting of the cable 14 does not avail an unauthorized attempt to remove the cable from the housing 12.

As noted earlier, the closure plate 62 may close the bore 50 and the cavity 64. Preferably, the hole 60 in the closure plate 62 is located on a axis of symmetry of the plate 62 so that the plate 62 may be located in the position shown or in a position which is rotated 180° into and out of the plane of the Figures. The closure plate 62 may be mounted to the housing 12 by fitting it into the end of the housing 12 and against a circumferential lip 98 so that it resides below the level of the end of the housing 12 and then rolling over the material of the housing 12 as shown at 100 to retain the plate 62. Other equivalent assemblies, such as where the housing is made of a robust non-metal, may of course be utilized.

While the foregoing describes preferred embodiments of the present invention, those having ordinary skill in the art will appreciate that numerous other arrangements may be utilized which fall within the spirit and scope of the following claims.

What is claimed is:

1. A security seal and lock for a lockable assembly, which comprises:

a robust housing having a path with a first end and a second end formed therethrough, the housing also having a generally cylindrical cavity which extends generally along and intersects the path, the zone of intersection of the path and the cavity constituting a chamber, the transverse dimension of the chamber decreasing in the direction of the first path end;

a flexible metal cable, a first end of which is held in the housing and a second end of which is selectively insertable through the lockable assembly and then through the first path end and out of the second path end so that the lockable assembly is sealed and locked by the resulting cable loop;

a ball in the chamber;

means in the chamber for biasing the ball toward the first path end, insertion of the second cable end into the first path end causing the cable to engage the ball and to move the ball against the action of the biasing means and away from the first path end to permit the second cable end to move along the path and out of the second path end, an attempt to reversely move the cable causing the action of the biasing means and the force of the cable on the ball to move the ball toward the first path end thereby jamming the ball against the wall of the chamber and the cable to prevent withdrawal of the cable; and means located between the biasing means and the ball and responsive to twisting of the cable incident to an attempt to withdraw the cable from the passage for increasing the jamming force on the cable.

2. A security seal and lock as set forth in claim 1, wherein:

the increasing means comprises a second ball larger than the first ball and located between the biasing means and the first ball in the chamber.

3. A security sealed lock as set forth in claim 2, wherein:

the second ball being made of a material which is sufficiently soft so that a twisting force on the cable which accompanies a pulling force on the cable causes the cable to dig into the second ball and to forcefully pull the second ball toward the first path end and into engagement with the first ball so that the second ball jams against the wall of the chamber and the cable and increases the jamming force exerted by the first ball on the cable.

4. A seal and lock, set forth in claim 2, wherein:

the biasing means comprises a spring acting between the housing near the second path end and the second ball.

5. A seal and lock, as set forth in claim 4, which further comprises:

a bore formed in the housing adjacent to the path and the cavity;

a ferrule mounted to the first end of the cable and located within the bore, the ferrule preventing movement of the first cable and out of the bore.

6. A security seal and lock, as set forth in claim 5, wherein the housing includes:

a plate having a central hole therethrough, the spring action against the plate; and means on the housing for retaining the plate attached thereto so that the bore and the cavity are closed thereby and the hole is aligned with the second end of the path.

7. A security seal and lock, as set forth in claim 6, wherein:

the second end of the path is equidistantly located between the cavity and the bore so that either portion of the plate on either side of the hole is capable of closing the cavity or the bore.

8. A security seal and lock, as set forth in claim 1, wherein:

the increasing means comprises a generally cylindrical member located between the biasing means and the ball and having a serrated surface facing the path, a twisting force on the cable which accompanies a pulling force causing the serrations to dig into the cable so that the member is pulled by the cable toward the first path end causing the member to jam against the cable and the wall of the chamber and moving the member against the ball to increase the jamming action thereof.

9. A security seal and lock as in claim 8, wherein:

the cylindrical member is so shaped as to be unable to rotate within the chamber about its axis generally parallel to the cable.

10. A security seal and lock as in claim 9, wherein:

the biasing means comprises a spring acting between the housing near the second path end and the cylindrical member.

11. A security seal and lock as in claim 10, wherein the housing includes:
  a plate having a central hole therethrough, the spring acting against the plate; and
  means on the housing for retaining the plate attached thereto so that the bore and the cavity are closed thereby and the hole is aligned with the second end of the path.

12. An improved security seal and lock of the type which includes (a) a flexible metal cable, a first end of which is held in a metal housing and a second end of which is selectively insertable through a lockable assembly and then through a first end and out of a second end of a path through the housing so that the assembly is sealed and locked by the resulting cable loop and (b) a one-way facility within the housing, the facility including a generally cylindrical cavity which extends generally along and is intersected by the path so that the path and the cavity constitute a chamber, the transverse dimension of which chamber decreases in the direction of the first path end, and a ball in the chamber which is biased by a spring member toward the first path end; insertion of the second cable end into the first path end causing the cable to engage the ball and move the ball against the bias and away from the first path end to permit the second cable end to move along the path and out of its second end, an attempt to reversely move the cable causing the bias and the drag force of the cable on the ball to move the ball toward the first path end thereby jamming the ball against the chamber and the cable to prevent withdrawal of the cable; wherein the improvement comprises:
  means located between the spring member and the ball and responsive to twisting of the cable incident to an attempt to withdraw the cable from the passage for increasing the jamming force on the cable.

* * * * *